(12) United States Patent
Sommers et al.

(10) Patent No.: US 11,709,746 B1
(45) Date of Patent: Jul. 25, 2023

(54) METHODS, SYSTEMS, AND COMPUTER READABLE MEDIA FOR SMART NETWORK INTERFACE CARD TESTING

(71) Applicant: Keysight Technologies, Inc., Santa Rosa, CA (US)

(72) Inventors: Christian Paul Sommers, Bangor, CA (US); Jonathan Glenn Stroud, Austin, TX (US); Matthew R. Bergeron, Sunol, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/587,811

(22) Filed: Jan. 28, 2022

(51) Int. Cl.
*G06F 11/00* (2006.01)
*G06F 11/263* (2006.01)
*G06F 11/22* (2006.01)

(52) U.S. Cl.
CPC .......... *G06F 11/263* (2013.01); *G06F 11/221* (2013.01)

(58) Field of Classification Search
CPC .. G06F 11/263; G06F 11/221; G06F 11/3006; G06F 11/3452
See application file for complete search history.

(56) References Cited

U.S. PATENT DOCUMENTS

| | | | |
|---|---|---|---|
| 10,152,441 B2 | 12/2018 | Liss et al. | |
| 10,678,721 B1* | 6/2020 | BeSerra | G06F 13/102 |
| 2013/0325974 A1* | 12/2013 | Matan | H04L 43/50 709/206 |
| 2013/0346628 A1* | 12/2013 | Canion | H04L 63/101 709/245 |
| 2017/0085459 A1* | 3/2017 | Xia | H04L 43/0876 |
| 2019/0199599 A1* | 6/2019 | Zavesky | H04L 41/0672 |
| 2020/0244562 A1 | 7/2020 | Paneah et al. | |
| 2020/0310846 A1* | 10/2020 | Moradi | H04L 43/20 |

OTHER PUBLICATIONS

"NVIDIA BLUEFIELD-2 DPU," NVIDIA, pp. 1-2 (2021).
"NVIDIA Extends Data Center Infrastructure Processing Roadmap with BlueField-3," NVIDIA Newsroom, https://nvidianews.nvidia.com/news/nvidia-extends-data-center-infrastructure-processing-roadmap-with-bluefield-3, pp. 1-12 (Apr. 12, 2021).

(Continued)

*Primary Examiner* — Joseph D Manoskey (57) ABSTRACT

Methods, systems, and computer readable media for smart network interface card testing are disclosed. One example method occurs at a network interface card (NIC) comprising a network processing unit executing a monitoring agent for monitoring data traversing the NIC. The method includes obtaining, from a test system or a test traffic generator, at least one test packet; generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC and generating the NIC processing information using the monitored events; and storing or providing the NIC processing information for data analysis.

20 Claims, 4 Drawing Sheets

(56) References Cited

OTHER PUBLICATIONS

"Linux Extended BPF (eBRF) Tracing Tools," https://www.brendangregg.com/ebpf.html, pp. 1-32 (2021).
Kennedy, "Pensando Distributed Services Architecture SmartNIC," https://www.servethehome.com/pensando-distributed-services-architecture-smartnic/, pp. 1-8 (Aug. 18, 2020).
Liu et al., "Offloading Distributed Applications onto SmartNICs using iPipe," SIGCOMM '19, pp. 1-16 (Aug. 19-23, 2019).
"PCI Express Design and Test from Electrical to Protocol," Keysight Technologies, pp. 1-12 (2017).
Schone et al., Scalable Tools for Non-Intrusive Performance Debugging.
Arnold, "Why is IEEE 1588 so accurate?" News and Tutorials from Meinberg, https://blog.meinbergglobal.com/2013/09/14/ieee-1588-accurate//.
Keniston et al., "Uprobes: User-Space Probes," IBM, pp. 1-22 (Apr. 15, 2010).
Fournier et al., "Combined Tracing of the Kernel and Applications with LTTng," In Proceedings, pp. 1-10 (2010).
Yang et al., "Design of NIC Based in I/O Processor for Cluster Interconnect Network," International Conference on Networking, Architecture, and Storage, pp. 1-6 (2007).
Sommers, "Open-Source Operating System (NOS) Tracing and Visibility", ip.com, pp. 1-8 (Aug. 2021).
Ameling et al., "Systems and Methods for Providing Audible Tone-Assisted Navigation," ip.com, pp. 1-8 (Jan. 2022).
"Pensando DSC-100 Distributed Services Card," Pensando, pp. 1-3 (2021).
Arnold, "One-step or Two-step?" News and Tutorials from Meinberg, https://blog.meinbergglobal.com/2013/10/28/one-step-two-step/.

* cited by examiner

METHODS, SYSTEMS, AND COMPUTER READABLE MEDIA FOR SMART NETWORK INTERFACE CARD TESTING

TECHNICAL FIELD

The subject matter described herein relates to network testing. More specifically, the subject matter relates to methods, systems, and computer readable media for smart network interface card testing.

BACKGROUND

Data center environments typically provide high reliability and security and typically include networked resources (e.g., virtual or physical servers connected via network switches) sharable by multiple clients of the data center operator. For example, a data center may include multiple servers or platforms with multiple network interface cards (NICs) connected to various network switches that are interconnected in a top-of-rack (ToR) or end-of-row (EoR) architecture.

Smart NICs (SmartNICs) may generally refer to specialized NICs that are pluggable into a server chassis. For example, a SmartNIC may utilize communication buses (e.g., high-speed peripheral component interconnect express (PCIe) buses) in communicating with a host processor (e.g., external to the SmartNIC), and may include on-board network interfaces (e.g., quad small form factor pluggable (QSFP) connector cages) which accept optical transceivers for connecting to network peers (e.g., a datacenter top-of-rack switch). SmartNICs may include a specialized network processing unit (NPU) including a field programmable gate array (FPGA) or a system on a chip (SoC) application-specific integrated circuit (ASIC), and may also include one or more on-board general-purpose central processing units (CPUs), graphics processing units (GPUs), data processing units (DPUs), or other processors.

Potential use-cases for SmartNICs can include performing infrastructure (e.g., datacenter fabric) related tasks (thereby offloading such tasks from a host server); accelerating host network stacks and certain workloads (e.g. crypto mining); isolating host tenant workloads from infrastructure related tasks (e.g., security); and/or assisting in virtualized networking and storage functions. For example, a SmartNIC or a processor therein (e.g., an NPU or a CPU) may include an operating system (OS) for interacting with a network, a host server OS, and/or host-based applications. In another example, a SmartNIC may include a programmable data plane processor for implementing programmable execution engines or performing various data plane tasks.

Since a SmartNIC may act as a server-on-a-card (e.g., by having one or more processors running an OS (e.g., Linux) or other software for performing various functions or specialized tasks), issues can arise in designing, debugging, measuring, analyzing, observing, and/or using SmartNICs.

SUMMARY

Methods, systems, and computer readable media for smart network interface card testing are disclosed. One example method occurs at a network interface card (NIC) including a network processing unit executing a monitoring agent for monitoring data traversing the NIC. The method includes obtaining, from a test system or a test traffic generator, at least one test packet; generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC and generating the NIC processing information using the monitored events; and storing or providing the NIC processing information for data analysis.

One example system includes a network processing unit and a NIC including the network processing unit executing a monitoring agent for monitoring data traversing the NIC, wherein the NIC is configured for: obtaining, from a test system or a test traffic generator, at least one test packet; generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC and generating the NIC processing information using the monitored events; and storing or providing the NIC processing information for data analysis.

One example non-transitory computer readable medium comprising computer executable instructions embodied in the non-transitory computer readable medium that when executed by at least one processor of at least one computer cause the at least one computer to perform steps comprising: at a NIC including a network processing unit executing a monitoring agent for monitoring data traversing the NIC: obtaining, from a test system or a test traffic generator, at least one test packet; generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC and generating the NIC processing information using the monitored events; and storing or providing the NIC processing information for data analysis.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for smart network interface card (SmartNIC) testing. In accordance with some aspects of the subject matter described herein, a test system (e.g., one or more computing platforms, devices, or nodes) may be configured to program, configure, and/or use a SmartNIC, e.g. a network interface card (NIC) that includes a network processing unit (e.g., a processor or chip) executing a monitoring agent for monitoring data traversing the NIC. For example, a SmartNIC may be configured for obtaining, from a test system, at least one test packet; generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC; and storing or providing the NIC processing information for data analysis.

In accordance with some aspects of the subject matter described herein, a test system or another system may obtain various data (e.g., processing information associated with different layers of communications stacks) associated with test traffic from one or more entities and may analyze and/or correlate the information for debugging, quality assurance, performance measurement and/or other purposes. For example, an example test system may trace the lifetime of a packet flow through different layers (e.g., open systems interconnection (OSI) layers 1-7) by analyzing complex interactions of software stacks from application layers all the way to kernel drivers and may also correlate or associate these interactions with layer 1 signaling and transport protocols of communications busses (e.g., peripheral component interconnect express (PCIe) buses). In this example, the test system may configure instrumentation or monitoring software on a host and may also configure software (e.g., using Linux kprobe(s), Linux uprobe(s), a Linux traffic control (TC) logic, extended Berkeley packet filter (eBPF) logic, and/or eXpress Data Path (XDP) logic) executing on one or more processors (e.g., an embedded NPU and/or a control CPU) of a SmartNIC. Continuing with this example, the test system or related correlation engine may use this information and optionally other data (e.g., captured bus activity using a hardware-based analyzer and/or probe capture data from test related software agents executing on a system under test (SUT)) to combine and correlate the data to show a complete picture, from the application layer to the physical signaling layer, of packet processing, where this correlated information can be sent to a user via a display device, e.g., the correlated information may be depicted or provided in various forms or formats such as drill-down, filterable reports, interactive graphs, etc.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
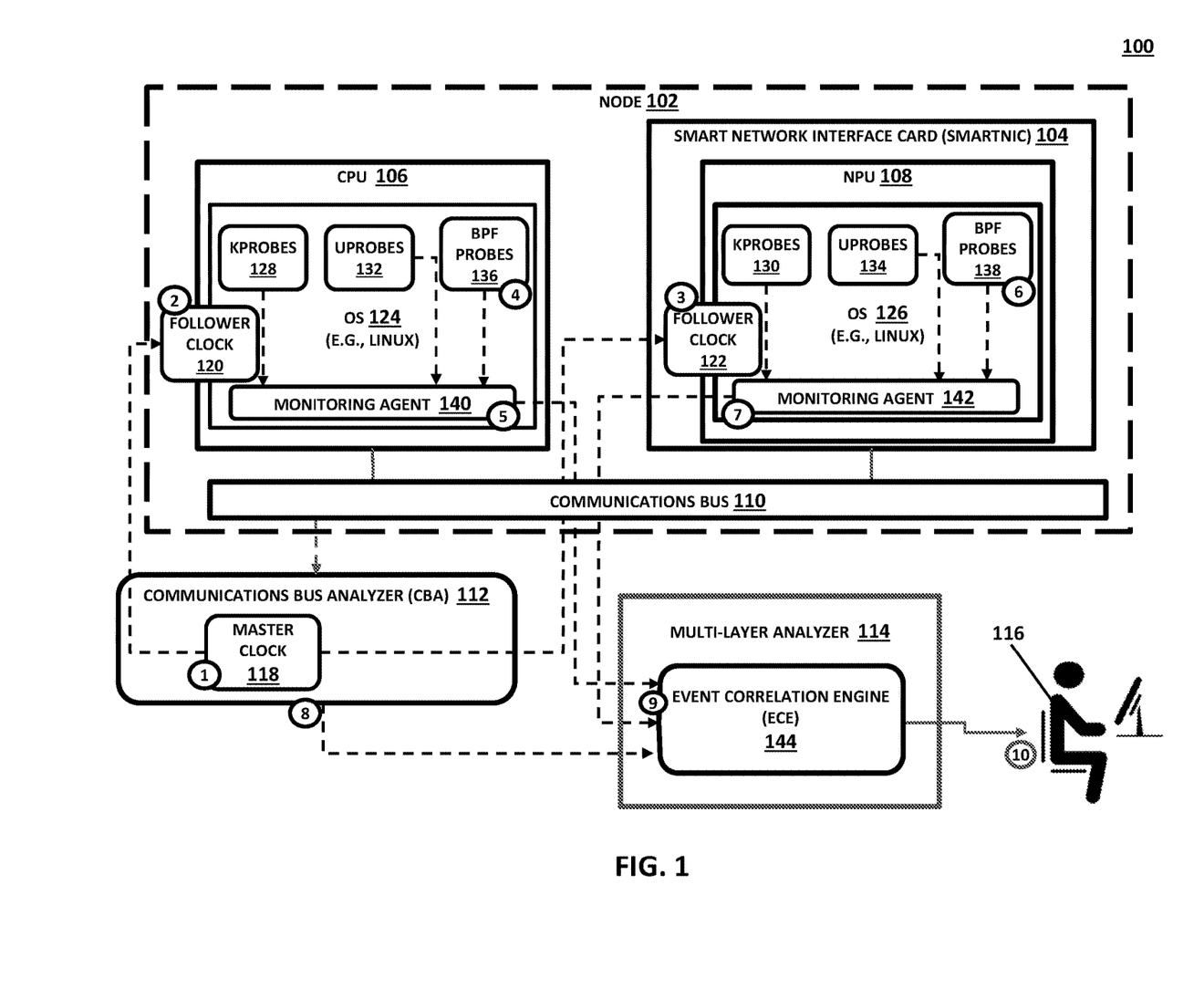
FIG. 1 is a diagram illustrating an example monitoring system for obtaining and correlating information associated with packet processing.

FIG. 1 is a diagram illustrating an example monitoring system 100 for obtaining and correlating various information associated with packet processing. For example, monitoring system 100 may include one or more networks and/or one or more computer platforms, nodes, or devices usable for monitoring various aspects of packet processing and related tasks. Monitoring system 100 may include a node 102, a communications bus analyzer (CBA) 112, a multi-layer analyzer (MLA) 114, and/or a user 116.

Node 102 may represent any suitable entity (e.g., one or more computing platforms, a host server, or a device implemented using at least one processor) for performing various aspects associated with performing network testing and/or other tasks or functions. For example, node 102 may include a network testing and/or visibility platform. In this example, node 102 may include hardware (e.g., multiple blades, cards, processors, etc.) configured for performing test functions (e.g., generating test traffic, sending test traffic, and/or responding to test traffic), quality assurance functions, debugging functions, and/or other functions. In some embodiments, node 102 or entities therein may be instrumented (e.g., using software based probes or other techniques) for monitoring communications and related events associated packet processing.

In some embodiments, node 102 may include a SmartNIC 104, a host CPU 106, and a communications bus 110. SmartNIC 104 may represent any suitable entity or entities (e.g., a PCIe card, a distributed services card (DSC), an Infrastructure Processing Unit (IPU) card, an Ethernet card) for sending and receiving network communications. In some embodiments, SmartNIC 104 may include one or more processors (e.g., general-purpose central processing units (CPUs), graphics processing units (GPUs), data processing units (DPUs), a field programmable gate array (FPGA) or a system on a chip (SoC), an application-specific integrated circuit (ASIC), etc.) for performing various functions, e.g., network processing functions, specialized tasks (e.g., crypto mining, parallel processing tasks, etc.), host offloaded tasks, and/or other services.

In some embodiments, SmartNIC 104 may refer to an integrated card (e.g., SoC) or various other physical embodiments. For example, SmartNIC 104 may include multiple processors and may utilize multiple processing components and a communications bus. In such embodiments, the communications bus may utilize PCI, PCIe, CXL, or some other standard(s).

SmartNIC 104 may include a network processing unit (NPU) 108. NPU 108 may include an FPGA, an SoC, an ASIC, and/or other hardware and/or firmware for performing various network functions. In some embodiments, NPU 108 may execute software for performing various functions including probing and monitoring communications and related events. For example, NPU 108 may run an OS 126 (e.g., an embedded Linux OS) that can execute various programs, dynamic software probes, and/or logic. In this example, OS 126 may execute logic or software (e.g., kernel probes (kprobes) 130, user-level probes (uprobes) 134 (e.g., user-level dynamic tracing), USDT (Userland Statically-Defined Tracing) probes, and/or other types of BPF probes 138) for monitoring and/or collecting packet processing data and/or event information (e.g., information about application and/or driver stack events). Continue with this example, the software may send collected data to a monitoring agent 142. Monitoring agent 142 may represent software for receiving probe data and may add timestamp information to the probe data and/or perform other functions before storing or sending the data (e.g., as a feed or periodic transfers) toward MLA 114.

Host CPU 106 may represent any suitable entity or entities (e.g., a CPU, an FPGA, an SoC, an ASIC, and/or other hardware and/or firmware) for performing various functions, e.g., executing test applications. In some embodiments, host CPU 106 may execute software for performing various functions including probing and monitoring communications and related events. For example, host CPU 106 may run an OS 124 (e.g., a Linux OS) that can execute various programs, dynamic software probes, and/or logic. In this example, OS 124 may execute logic or software (e.g., kprobes 128, uprobes 132, USDT probes, and/or other types of BPF probes 136) for monitoring and/or collecting packet processing data and/or event information (e.g., information about application and/or driver stack events). Continue with this example, the software may send collected data to a monitoring agent 140. Monitoring agent 140 may represent software for receiving probe data and may add timestamp information to the probe data and/or perform other functions before storing or sending the data (e.g., as a feed or periodic transfers) toward MLA 114.

In some embodiments, CPU 106 and NPU 108 may be on the same physical card or circuit board. In such embodiments, SmartNIC 104 may be a physical or logical entity (e.g., function, module, hardware, component, etc.) that is co-located with NPU 108 and/or other entities. For example, instead of a physically separate component (e.g., a separate plug-in card located in node 102), SmartNIC 104 may be an SoC integrated into a host computer board comprising host CPU 106.

In some embodiments, probe or instrumentation software running on NPU 108, host CPU 106, or another processor in node 102 may utilize various types of tracing methods. For example, probe or instrumentation software running or executing on NPU 108 or host CPU 106 may include or utilize uprobes that are dynamically attached to running programs (e.g., network processing logic executing on NPU 108) and may also include or utilize USDT probes that are statically defined in source code (e.g., network processing logic or a custom Linux OS executing on NPU 108).

In some embodiments, probe or instrumentation software running or executing on NPU 108 or host CPU 106 may include or utilize tracing or probing software for monitoring and/or recording events at different layers. For example, probe or instrumentation software running or executing on NPU 108 or host CPU 106 may include or utilize BPF-type probes (e.g., kprobes, uProbes, USDT probes) for monitoring or capturing various lower layer events (e.g., OS layer events like driver events and/or kernel events). In this example, probe or instrumentation software running or executing on NPU 108 or host CPU 106 may also include or utilize network-level probes for monitoring or capturing various higher layer events, e.g., network-level probes may utilize Linux TC or XDP mechanisms for monitoring packet or network events. In some embodiments, various level or layer probe mechanisms may trigger execution of custom probe code written in BPF or another programming language.

In some embodiments, SmartNIC 104, host CPU 106, or NPU 108 may implement one or more test system entities, e.g., a test traffic generator or receiver. For example, monitoring system 100 or a related entity (e.g., user 116) may configure and/or utilize testing and monitoring software on multiple processors in node 102 (e.g., a host server or tester) as well as configuring and/or utilizing testing and monitoring software and/or hardware external to node 102, thereby allowing more control and/or better performance monitoring during test sessions. In this example, such a configuration may allow monitoring system 100 or a related entity to control and monitor test traffic and various software layers to effectively measure the performance of SUT 310, e.g., PCIe hardware or related devices.

In some embodiments, SmartNIC 104 or processor(s) therein (e.g., NPU 108) may include testing related applications (e.g., emulation software or data plane and/or control plane software) and/or related hardware for generating and sending test traffic toward SUT 310 or other entities. Continuing with this example, SmartNIC 104 or processor(s) therein (e.g., NPU 108) may include probe or instrumentation software (e.g., configured by TC 104) for monitoring various layer events or transactions (e.g., application layer events, driver events, kernel events, etc.) as test packets traverse SmartNIC 104 (e.g., events associated with test traffic generation, test packet processing, and/or test traffic response reception).

Communications bus 110 may represent any suitable entity (e.g., a PCIe bus or CXL bus) for facilitating communications between components or entities of node 102. For example, communications bus 110 may be a physical channel, a circuit path, or a communications system (e.g., an internal and/or external data bus system) that allows messages or information to be communicated between SmartNIC 104 and host CPU 106 and/or between other entities (e.g., PCIe devices) of node 102.

CBA 112 may represent any suitable entity or entities (e.g., a device, a card, or software executing on one or more processors) for monitoring, copying, and/or analyzing bus transactions, related events, or other information. For example, CBA 112 may include an external or internal PCIe bus analyzer/diagnostic device coupled to communications bus (e.g., an internal PCIe bus of node 102) via a physical connection, such that copies of PCIe and/or NVMe bus communications can be obtained. In this example, CBA 112 may collect and generate bus transactions in logs with timestamp information and may store or send the logs and/or other information (e.g., as a feed or periodic transfers) to MLA 114.

In some embodiments, monitoring system 100 or entities thereof may utilize a time synchronization protocol (e.g., a precision time protocol (PTP) or a network time protocol (NTP)) or other time synchronization mechanism such that log and/or event data sources can use or provide data with synchronized timestamps. For example, node 102, SmartNIC 104, and CBA 112 may utilize an IEEE 1588 PTP protocol to synchronize each of the data sources providing a capture or event log feed to MLA 114. In this example, a master clock 118 may be integrated or co-located with CBA 112 and follower clocks 120-122 may be implemented in host CPU 106 and NPU 108, respectively. In another examples, master clock 118 could be provided by a stand-alone element (e.g., an NTP or PTP server) or could be integrated within other entities of monitoring system 100.

In some embodiments, e.g., in addition to or in lieu of a time synchronization protocol, monitoring system 100 or entities therein may utilize one or more time-alignment algorithms (e.g., a heuristic time-alignment method or time adjustment method) for improving time precision and/or reducing errors, inconsistencies, or other issues when comparing or analyzing timestamps provided by multiple entities or sources. For example, a time-alignment algorithm may include a calibration procedure. In this example, the calibration procedure may obtain timestamps for one or more test packets as its traverses a host CPU 106, SmartNIC 104, and CBA 112 and then determine whether the timestamps from host CPU 106, SmartNIC 104, and CBA 112 are increasing (e.g., as expected) as the packet traverses the entities. This determination may include correlating the contents of captured data associated with the test packet(s) at each probe point would ensure the same packet is being monitored during the calibration. Using this collected information and related analysis, the time-alignment algorithm may compute one or more correction value(s) (e.g., one or more timestamp offsets, timestamp correction factors, or timestamp correction formulas usable for adjusting timestamps received from various probe points or entities) to improve time precision and/or accuracy, e.g., correction value(s) may ensure that timestamps from the various entities appear to be accurate and logically, e.g., ensuring that timestamps don't indicate a negative amount time for packets to travel from one domain to another domain.

In some embodiments, a time-alignment algorithm that uses observed behaviors or related metrics (e.g., timestamps from a "calibration" set of test packets) may periodically or aperiodically recalibrate and (re-)compute or adjust correction values. For example, every two minutes or prior to executing a test session, CBA 112 may obtain new or updated data (e.g., timestamps of test packets, network conditions, or test changes) and use the new data in computing one or more new time correction values.

In some embodiments, a time-alignment algorithm may automatically compute a correction value or may utilize user involvement in computing and/or selecting a correction value. For example, node 102 or another entity may run a time-alignment algorithm or a related calibration procedure to automatically generate a time correction value. In this example, user 116 may be notified of the computed time correction value and may be able to change or accept the computed time correction value, e.g., via a GUI.

MLA 114 may represent any suitable entity or entities (e.g., a device, a card, or software executing on one or more processors) for obtaining or receiving various data (e.g., packet capture data, transactions logs, event logs, or other information) associated with packet processing. MLA 114 and/or an event correlation engine (ECE) 144 therein may analyze and/or correlate the obtained data from one or more data sources to provide insights and/or correlated information to user 116.

In some embodiments, MLA 114 or ECE 144 therein may utilize one or more correlation processing algorithms to process and correlate packet processing data. For example, MLA 114 or ECE 144 therein may utilize a correlation algorithm that utilizes different methods or techniques to correlate information feeds or data therein. In this example, the correlation algorithm may use timestamps as a first-order means of correlation (e.g., ordering and/or linking events based on timestamps), and heuristic methods (e.g., based on historical data) may also supplement or further correlations (e.g., when events appear to occur at substantially the same time), e.g., by examining contents of the captures at various stages and finding a "most-likely" chain of events. In some embodiments, MLA 114 or ECE 144 therein may utilize an algorithm which attempts to line up various timelines (e.g., entity feeds, layer data, etc.) to achieve a "best fit" using a correlation algorithm (e.g., based on contents, timestamps, metadata, and/or heuristics).

In some embodiments, MLA 114 or ECE 144 may generate and/or provide (e.g., report) correlation information and, optionally, correlation metadata, such as suggested interpretations or meanings of particular observed events or sequences of observed events. For example, in addition to providing a filterable report indicating correlated events associated with various communications layers (e.g., layers 1-7, layers 3-7, layers 3-6, layers 2-4, etc.), MLA 114 may also use a correlation and/or heuristics algorithm to provide metadata or other information for potential interpretations (e.g., differing interpretations) to user 116.

User 116 may represent any entity (e.g., an automated system, a display device, or a device or system controlled or controllable by a human user) for receiving and/or viewing information received from MLA 114 or ECE 144. For example, user 116 may receive correlated packet processing information from MLA 114 and may utilize a GUI or other UI for displaying and exploring received information.

As depicted in FIG. 1, example steps or operations for obtaining and correlating communications and related events involving packets traversing elements of monitoring system 100 are depicted.

Referring to FIG. 1, in step 1, master clock 108 associated with CBA 112 may initiate a synchronization process (e.g., by using PTP, NTP, or another time synchronization protocol) with follower clock 120 associated with host CPU 106 and may initiate a synchronization process with follower clock 122 associated with NPU 108 of SmartNIC 104.

In step 2, follower clock 120 associated with host CPU 106 may synchronize with master clock 118 for providing high-precision timestamps when monitoring various events or communications occurring at host CPU 106.

In step 3, follower dock 122 associated with NPU 108 may synchronize with master dock 118 for providing high-precision timestamps when monitoring various events or communications occurring at SmartNIC 104.

Following steps 1-3, host CPU 106 (and host 102), SmartNIC 104, and CBA 112 may be all synchronized to the same master dock (e.g., a PTP master or boundary dock) and, consequently, all packet capture and/or event log timestamps generated by these three entities may be synchronized.

In step 4, one or more software based probes (e.g., kprobes 128, uprobes 132, BPF probes 136, etc.) operating in host CPU 106 are configured to generate probe data associated with activities of node 102 (e.g., a host server) or related applications and to communicate at least some of this information to monitoring agent 140, which resides in or on host CPU 106. In some embodiments, the probes may be configured to associate timestamps with the information collected or generated, and, as such, the information communicated to monitoring agent 140 may include timestamp information. In some embodiments, the probes may communicate information collected or generated to monitoring agent 140, and monitoring agent 140 may be configured to append or add timestamp information to the received information, e.g., as it is received.

In step 5, monitoring agent 140 may communicate timestamped packet capture and/or event log information to MLA 114.

In step 6, one or more software based probes (e.g., kprobes 130, uprobes 134, BPF probes 138, etc.) operating in NPU 108 of SmartNIC 104 are configured to generate probe data associated with activities of SmartNIC 104 or related services or tasks and to communicate at least some of this information to monitoring agent 142, which resides in or on SmartNIC 104.

In some embodiments, the probes may be configured to associate timestamps with the information collected or generated, and, as such, the information communicated to monitoring agent 140 may include timestamp information. In some embodiments, the probes may communicate information collected or generated to monitoring agent 140, and monitoring agent 140 may be configured to append or add timestamp information to the received information, e.g., as it is received.

In step 7, monitoring agent 142 may communicate timestamped packet capture and/or event log information to MLA 114.

In step 8, OBA 112 may generate and communicate timestamped packet capture and/or event log information to MLA 114.

In step 9, OBA 112 may receive feeds of timestamped packet log/event log information feeds from different sources and may apply one or more correlation processing algorithms to process some or all of the information feeds.

In step 10, information (e.g., results of the correlation processing of step 9) may be reported and/or displayed to user 116.

In some embodiments, information presented to user 116 may include time charts, graphs, listings, and/or hierarchical data structures usable for filtering or drill-downs to view data in application layers, driver layers, kernel layers, or physical (e.g., PCIe) layers. For example, an analyzer application or GUI therein may allow user 116 to see different levels of packet processing data, e.g., by drilling-down into packet header layers and payload layers. In such embodiments, e.g., in addition to drilling down to view granular details, information provided to user 116 may also include higher-level insights e.g., TOP packet '123' was sent to SmartNIC 104 and sliced into multiple packet segments; and here are the corresponding acknowledgement messages from a far-end host 2'; and here is the TOP congestion algorithm responding to end-to-end network congestion (if relevant).

It will be appreciated that FIG. 1 is for illustrative purposes and that various depicted entities, their locations, and/or their functions described above in relation to FIG. 1 may be changed, altered, added, or removed. Further, interactions between entities in FIG. 1 may be different than those described above in relation to FIG. 1. For example, other implementations of monitoring system 100 may include varying numbers and types of packet capture/event log sources from different types of network components (e.g., both software components and/or hardware components). Further, it will also be appreciated that while some software probes described above are Linux based mechanism, software probes capable of running on other OSes may be used for obtaining or providing various data (e.g., packet capture data, event log information, and/or other information) to MLA 114.

Figure 2:
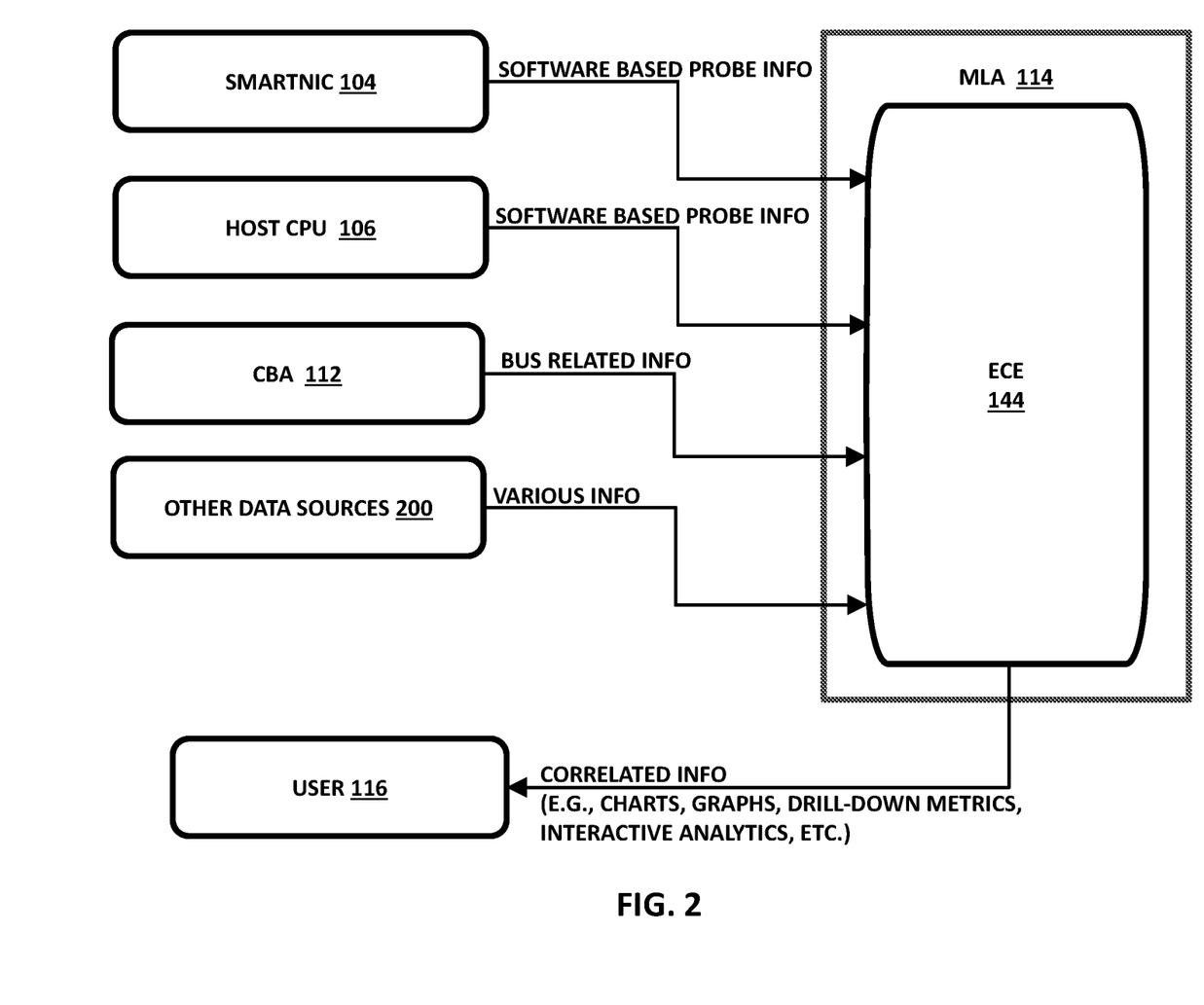
FIG. 2 is a diagram illustrating an example event correlation engine using various information.

FIG. 2 is a diagram illustrating ECE 144 using various information. In some embodiments, ECE 144 may use processing information and/or other information from multiple sources. For example, ECE 144 may receive or obtain test packet processing information collected, computed, or derived by SmartNIC 104, host CPU 106, CBA 112, and other data sources 200. In this example, information from a given entity may be collected or obtained using various methods or techniques.

In some embodiments, ECE 144 may obtain various packet processing information (e.g., application/driver stack events, network layer information, transport layer information, session layer information, presentation layer information, and/or application layer information) associated with handling test packet(s). In such embodiments, this information may be collected or obtained by using configured software probes or software related mechanisms, e.g., a Linux kprobe, a Linux uprobe, and/or eBPF logic running on a processor in SmartNIC 104, host CPU 106, or host 102.

In some embodiments, ECE 144 may obtain various bus information (e.g., physical layer information, data link layer information, and/or transaction layer information) associated with PCIe transactions or other communications bus transactions involved with processing or handling test packet(s). In such embodiments, the bus information may be collected or obtained by using configured hardware probes or other mechanisms in CBA 112.

In some embodiments, ECE 144 may obtain various information (e.g., network load information, latency metrics, drop packet metrics, etc.) associated with processing or handling test packet(s) from various other data sources 200, e.g., external probes, a network monitoring system, and/or other entities.

In some embodiments, MLA 114 or CEC 144 may obtain and correlate different types of information associated with packet processing. For example, CEC 144 may obtain USB trace information, Ethernet trace information, communications bus trace information, driver events, and other information associated with test packets, e.g., from one or more capture files. In this example, CEC 144 may merge and/or correlate the different types of data using high-precision timestamps, e.g., placing interactions on a single timeline thereby effectively allowing users to view events or correlations between packets on the wire and related communications bus transactions or other interactions.

In some embodiments, systems, methodologies, or functionality described herein may be usable for quality assurance and validation of ASICs, both pre-silicon and post-silicon. For example, systems, methodologies, or functionality described herein may be usable by firmware engineers for developing bug-free firmware, by kernel developers for developing efficient kernels, and by software engineers for developing high performance applications. For example, by using architecture and/or methodologies described herein, an application developer may identify "pain points" causing poor application performance, e.g., occurring in a physical layer and/or a data link layer that the developer may is less familiar with.

It will be appreciated that FIG. 2 is for illustrative purposes and that various depicted entities, their locations, and/or their functions described above in relation to FIG. 2 may be changed, altered, added, or removed.

Figure 3:
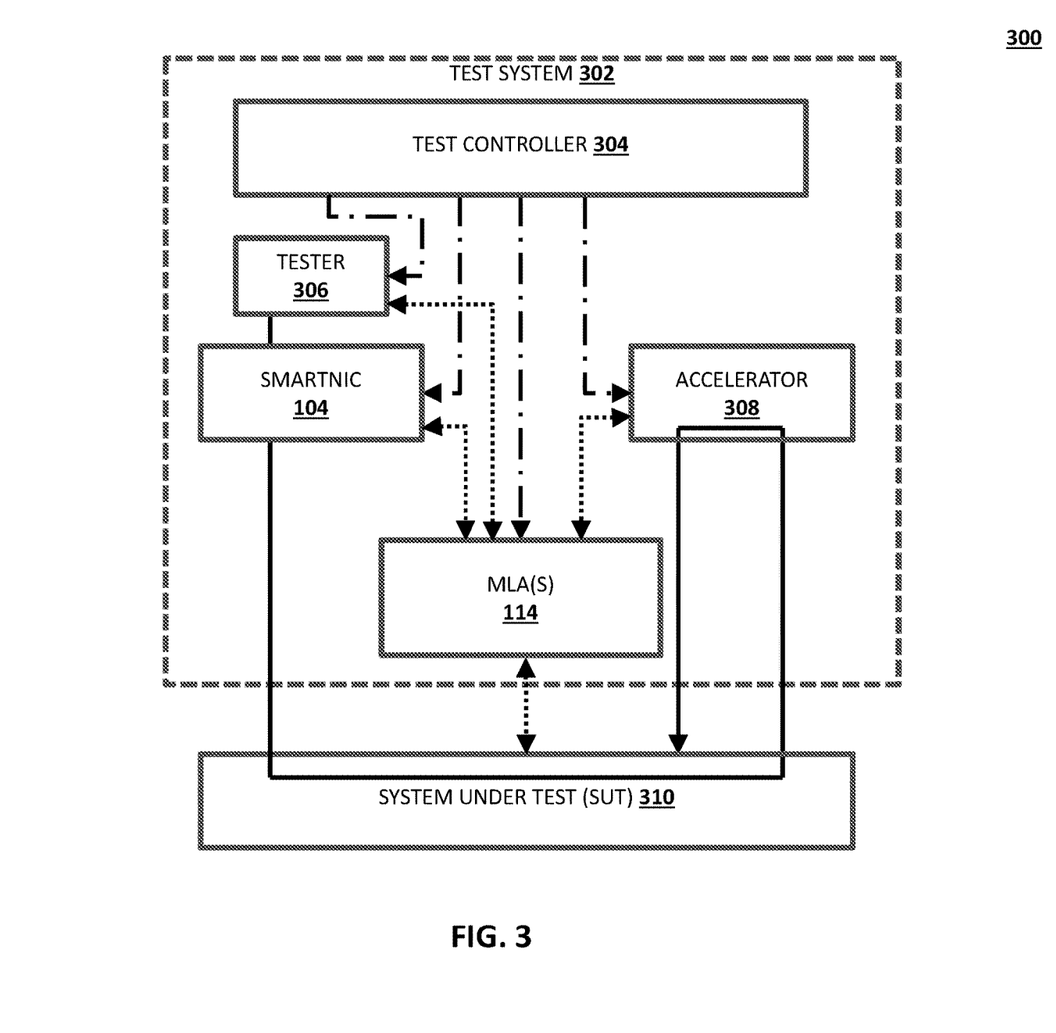
FIG. 3 is a diagram illustrating an example test environment for testing a system under test (SUT)

FIG. 3 is a diagram illustrating an example test environment 300 for testing a SUT 310. Test environment 300 may include one or more networks and/or one or more computer platforms, nodes, or devices. For example, test environment 300 may include or use a testbed (e.g., network switches and/or interconnected devices) for instrumentation techniques or probing to obtain information (e.g., performance information, metadata, and/or other information) about various aspects related to testing SUT 310. In another example, test environment 300 may include nodes (e.g., tester 304) or software agents (e.g., monitoring agents 140-142) that are deployed and executed in a network operator's network(s) (e.g., a production network) or a test network. In this example, the nodes or software agents may be configured for instrumentation techniques or probing to obtain information (e.g., performance information, metadata, and/or other information) about various aspects related to testing SUT 310.

Referring to FIG. 3, test environment 300 may include a test system 302 and SUT 310. Test system 302 may represent any suitable entity or entities (e.g., one or more computing platforms, nodes, or devices) associated with testing SUT 310 (e.g., one or more application servers, a network controller, or a NMS). For example, test system 302 or a related entity (e.g., a transmit engine or receive engine) may generate and send traffic to SUT 310 and/or receive traffic from SUT 310 and may analyze one or more performance aspects associated with SUT 310.

In some embodiments, test system 302 may include a stand-alone tool, a testing device, a network equipment test device or platform, or software executing on one or more processor(s). In some embodiments, test system 302 may be a single device or node or may be distributed across multiple devices or nodes. In some embodiments, test system 302 may include one or more modules for performing various test related functions. For example, test system 302 may include a traffic (e.g., packet) generator for generating test traffic and/or testing related applications (e.g., a test analyzer or test configuration manager) for testing SUT 310.

In some embodiments, test system 302 may include a test controller (TC) 304, a tester 106, a SmartNIC 104, one or more MLA(s) 114, and/or an accelerator 308. In some embodiments, test system 302 and/or another entity may include or utilize one or more user interfaces for receiving settings and/or configuration information for setting up a testing scenario or a related test session. For example, a user interface may include any interface usable by one or more types of user (e.g., a human or another entity like an application, a machine, or a device) to interact with test system 302 or related entities. In some embodiments, one or more user interfaces may support automation e.g., via one or more programming languages (e.g., python), a representational state transfer (REST) API, a remote procedure call API (e.g., gRPC API), a command line interface (CLI), a machine-to-machine (M2M) automation interface, and/or a web based GUI. For example, a test operator may use a web browser to interact with a web based GUI associated with TC 104 and/or tester 306 for programming or configuring one or more aspects for testing SUT 310. In another example, a network controller may utilize an API interface for programming or configuring one or more aspects for testing SUT 310.

TC 104 may be any suitable entity or entities (e.g., software executing on a processor, a FPGA, and/or an ASIC, or a combination of software, an FPGA, and/or an ASIC) for performing one or more aspects associated with testing SUT 310 and/or various aspects thereof. In some embodiments, TC 104 may be implemented using one or more processors and/or memory. For example, TC 104 may utilize one or more processors (e.g., executing software stored in memory) to generate traffic patterns or scenarios for various message streams (e.g., flows or sessions). In another example, TC 104 may also utilize one or more processors to perform or initiate various tests and/or analyses involving test packets and/or related responses from SUT 310. In this example, TC 104 may send instructions to various modules or entities (e.g., tester 306, SmartNIC 104, accelerator 308, and MLA(s) 114) in test system 302 for controlling (e.g., to pause, (re)start, or stop) a test session and/or configuring aspects thereof.

In some embodiments, TC 104 may utilize various (e.g., out-of-band and/or in-band) ports and/or interfaces for communicating with entities of test system 302. For example, in embodiments where TC 104 is external to tester 306, SmartNIC 104, accelerator 308, and/or MLA(s) 114, TC 104 may communicate with these entities via a management address, a management port, and/or a related interface. For example, TC 104, tester 306, SmartNIC 104, accelerator 308, and MLA(s) 114, and/or other test system entities may communicate via a test system API or a related server. In such embodiments, TC 104 may use the test system API or the related server to send command and control instructions (e.g., configuration information, eBPF logic, monitoring/instrumentation logic ,etc.) to one or more test related entities.

In some embodiments, TC 104 may interact with one or more tester(s) 306 or related testing applications. Tester 306 may represent a device or software for configuring test system 302 or portions thereof. In some embodiments, tester 306 may include node 102 or similar functionality described above. For example, tester 306 may be a host server configured to execute or initiate, but are not limited to, visibility applications, SDN controller applications, GUI and CLI applications, and test traffic generation applications for communicating with SUT 310 and/or an emulated switching fabric environment implemented using an emulation device or platform.

In some embodiments, tester 306, SmartNIC 104, accelerator 308, and/or MLA(s) 114 may include or utilize a reporting module and may be configurable by TC 104. For example, a reporting module may be any suitable entity or entities (e.g., software executing on a processor, an ASIC, an FPGA, or a combination of software, an ASIC, or an FPGA) for reporting various information about testing using network visibility functions and/or components (e.g., using virtual or physical probes or network taps). In this example, virtual taps or software may be configured to generate and/or provide processing or performance metrics or other information (e.g., network telemetry, status information, etc.) associated with one or more communications layers (e.g., OSI layers 1-7) as test packet or related data is processed or traverses an element. Continuing with this example, the reporting module may provide or report collected data or derivation thereof (e.g., performance reports, summaries, metadata, etc.) to MLA(s) 114 or related ECE(s) 144 therein for further data analysis.

In some embodiments, tester 306 may include or utilize one or more traffic generators, e.g., a hardware based packet blaster or a software based packet blaster. For example, a traffic generator may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. In this example, the traffic generator may be configured to utilize user input and predefined test session templates or related data to generate one or more test cases and/or test sessions.

SmartNIC 104 may include a NIC with NPU 108 and/or another processor executing OS 126 or other software (e.g., monitoring agent 142) for monitoring, collecting, and/or reporting various NIC processing information (e.g., layer 3-7 information and/or other lower layer information (e.g., OS layer information, driver layer information, kernel layer information)) associated with receiving, processing, sending, or responding to one or more test packets. For example, OS 126 or monitoring agent 142 may use a Linux kprobe, a Linux uprobe, a Linux USDT probe, an XDP hook, a TC hook, BPF logic, or eBPF logic to capture NIC processing information. In another example, e.g., where OS 126 is a non-Linux OS, other types of software probes or tracing techniques may be used to obtain or capture NIC processing information. In some embodiments, monitoring agent 142 may send collected information to MLA 114 for correlation with other data provided by various sources.

In some embodiments, tester 306 or another test system entity may include or use a SmartNIC 104. For example, SmartNIC 104 may be located at tester 306 and may be configured to receive and/or send test traffic toward SUT 310 or other entities. In another example, SmartNIC 104 may include or implement a test traffic generator. In this example, SmartNIC 104 or processor(s) therein (e.g., NPU 108) may include testing applications and/or related hardware for generating and sending test traffic toward SUT 310 or other entities. Continuing with this example, SmartNIC 104 or processor(s) therein (e.g., NPU 108) may include probe or instrumentation software (e.g., configured by TC 104) for monitoring various layer events or transactions (e.g., application layer events, driver events, kernel events, etc.) as test packets traverse SmartNIC 104 (e.g., events associated with test traffic generation, test packet processing, and/or test traffic response reception).

Accelerator 308 may represent a specialized NIC (e.g., a SmartNIC) for performing and/or accelerating a task, e.g., cryptography related mining or network functions. In some embodiments, accelerator 308 may include a NIC with NPU 108 and/or another processor executing OS 126 or other software (e.g., monitoring agent 142) for monitoring, collecting, and/or reporting various information (e.g., layer 3-7 information) associated with receiving, processing, sending, or responding to one or more test packets. For example, OS 126 or monitoring agent 142 may use a Linux kprobe, a Linux uprobe, a Linux USDT probe, an XDP hook, a TC hook, BPF logic, or eBPF logic to capture processing information. In another example, e.g., where OS 126 is a non-Linux OS, other types of software probes or tracing techniques may be used to obtain or capture NIC processing information. In some embodiments, monitoring agent 142 may send collected information to MLA 114 for correlation with other data provided by various sources.

In some embodiments, tester 306 or another test system entity may include or use accelerator 308. For example, accelerator 308 may be located at tester 306 and may be configured to forward or send test traffic or related responses toward SUT 310 or other entities. In another example, accelerator 308 may include or implement a test system and may generate and sent test packets or related responses toward SUT 310 or other entities.

In some embodiments, each of SmartNIC 104 and accelerator 308 may include or utilize any suitable entity or entities (e.g., one or more network interface cards (NICs), pluggable jacks, physical processors, transceiver modules, direct-attach cables (DACs) and/or other hardware) for sending or receiving communications. For example, SmartNIC 104 may use one or more multiple ports (e.g., physical connection ports) for receiving and sending various types of test packets or related data units; such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

SUT 310 may represent any suitable entity or entities (e.g., devices, systems, or platforms) for being tested by test system 302 or related entities. In some embodiments, SUT 310 may include one or more servers connected via a data center switching fabric or a network. For example, SUT 310 may include a network node, a network switch, a network router, a network interface card, a packet forwarding device, or one or more virtual network functions (VNF) connected via one or more real or emulated network switches. In this example, SUT 310 or a VNF thereof may be software in a virtual container or machine (VC/M) executing on shared resources (e.g., compute, storage, and network resources in a cloud computing environment) and be communicatively coupled to SmartNIC 104, MLA(s) 114, accelerator 308, and/or various other test related entities.

In some embodiments, test system 302 or related entities (e.g., TC 104, testing applications 110, TE 106, RE 108, and/or MLA(s) 114) may include functionality for accessing shared data storage, e.g., a network accessible storage (NAS) system. Shared data storage may be usable for storing various types of information, e.g., testing information, processing information, performance information, and/or cor-related information. For example, various test system entities may provide or store (e.g., periodically or when requested) collected processing information associated with processing or handling one or more test packets in the shared data storage. In this example, MLA(s) 114 or ECE(s) 144 may use the stored data to generate correlated reports or other correlated information (e.g., interactive charts or graphics) to user 116 and may also store the correlated information or related data to the shared data storage for later retrieval. In some embodiments, shared data storage may be located at test system 302, another node, or distributed across multiple platforms or devices.

In some embodiments, data storage for test system 302 or related entities may include test traffic models, test cases, test session data, topology information for emulated test environments and/or for SUT 310, and/or other information usable for generating performance metrics (e.g., statistics) associated with one or more aspects of SUT 310.

In some embodiments, test environment 300 may be usable for tracing the entire lifetime of a packet or packet flow. For example, by using instrumentation techniques and/or probes in SmartNIC 104 and/or entities, test system 302 may trace the entire lifetime of a packet flow by obtaining and correlating various information (e.g., different communications layers associated with processing one or more test packets), test system 302 may be usable for detecting issues and/or performing quality assurance, e.g., by identifying various issues occurring to one or more communications layers.

It will be appreciated that FIG. 3 is for illustrative purposes and that various depicted entities, their locations, and/or their functions described above in relation to FIG. 3 may be changed, altered, added, or removed. For example, a device (e.g., a computer including at least one processor coupled to a memory) may include functionality of TC 104, tester 306, SmartNIC 104, accelerator 308, and MLA(s) 114. Further, while FIG. 3 depicts an example testing architecture, it will be appreciated that various forms of 1-arm, 2-arm, or additional arm test environments may utilize SmartNIC 104 and/or MLA 114 to obtain and correlate packet processing information from various data sources.

Figure 4:
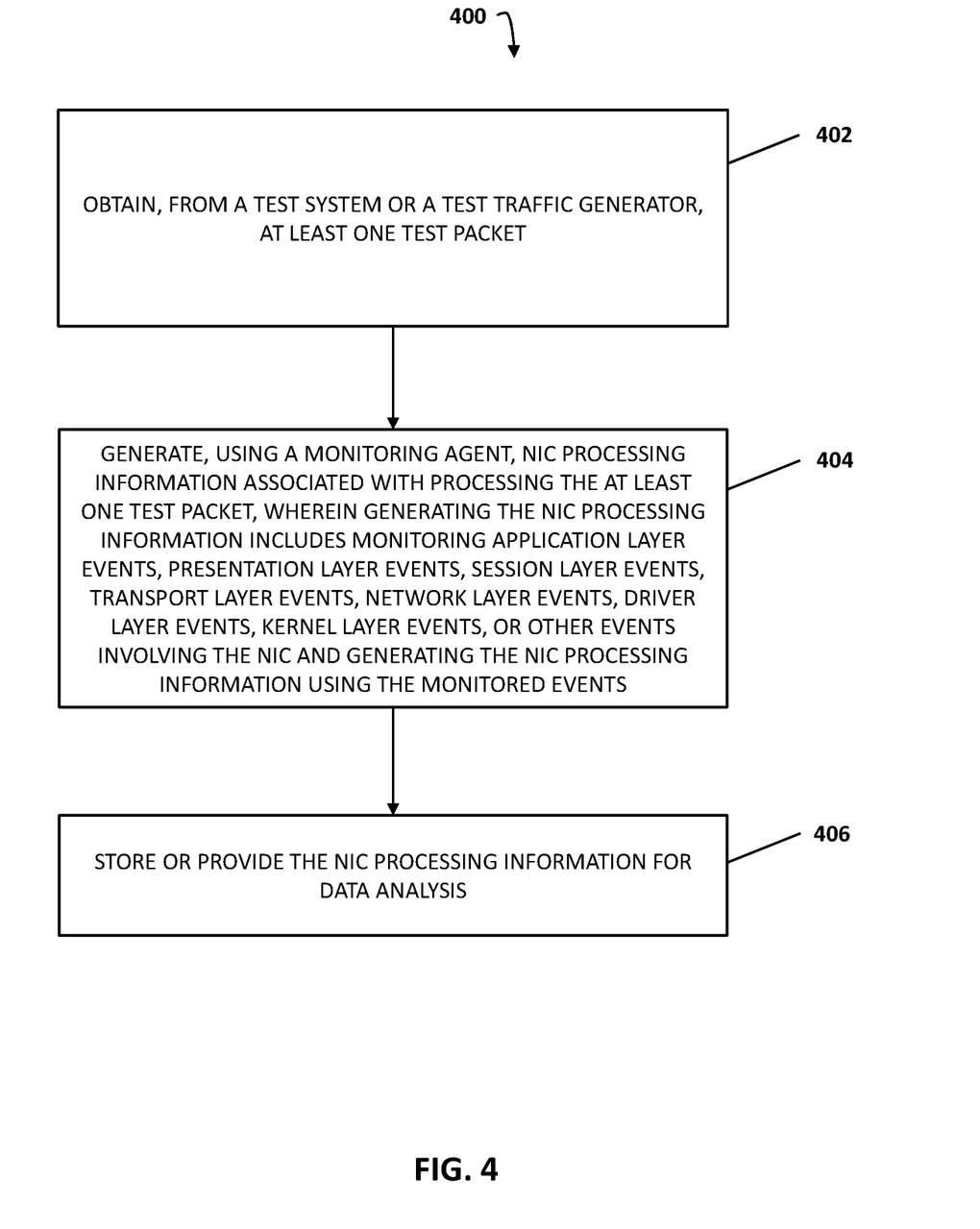
FIG. 4 is a diagram illustrating an example process for smart network interface card testing.

FIG. 4 is a diagram illustrating an example process 400 for SmartNIC testing. In some embodiments, process 400, or portions thereof, may be performed by or at node 102, SmartNIC 104, accelerator 308, MLA(s) 114, test system 302, and/or another node or module (e.g., an impairment module). In some embodiments, process 400 may include various operations, e.g., steps 402-406.

Referring to process 400, in step 402, at least one test packet may be obtained from a test system or a test traffic generator, e.g., node 102, tester 306, a transmit engine of test system 302, etc. For example, tester 306 may be configured by test controller 304 to generate a plurality of test packets that may simulate a user interacting with a web application. In this example, the generated test packets may be sent to SmartNIC 104 (e.g., via a communications bus or a network) prior to the test packets being sent to SUT 310 or another entity. In another example, SmartNIC 104 or processor(s) therein (e.g., NPU 108) may include or implement a software based test packet generator configured to generate and send one or more test packets toward SUT 310 or other entities.

In step 404, NIC processing information associated with processing the at least one test packet may be generated using the monitoring agent. In some embodiments, generating the NIC processing information may include monitoring application layer events, presentation layer events, session layer events, transport layer events, network layer events, driver layer events, kernel layer events, or other events traversing the NIC and generating the NIC processing information using the monitored events. For example, monitoring agent 142 executing in NPU 108 of SmartNIC 104 may be associated with a Linux OS or related probing system that monitors different events or communications occurring at or involving SmartNIC 104. In this example, monitoring agent 142 may obtain, derive, and/or store various information (e.g., application layer information, presentation layer information, session layer information, and/or network layer information) associated with various monitored events, e.g., as a test packet or related data is processed or traverses SmartNIC 104.

In step 406, the NIC processing information may be stored or provided for data analysis. For example, SmartNIC 104 or a related entity may store various collected information from software probes in local or network accessible storage. In this example, MLA 114 may retrieve or obtain the stored information and used it in generating correlated performance reports indicating performance involving multiple communications layers as one or more test packets are processed during a test session in test environment 100.

In some embodiments, a test system (e.g., test system 302) may be configured for obtaining, from one or more sources (e.g., node 102, SmartNIC 104, accelerator 308, a data storage, a host OS, etc.), performance information associated with the at least one test packet, wherein the performance information includes NIC processing information; correlating, using at least one correlation technique, the processing performance information; and providing correlated processing performance information to a test system user.

In some embodiments, performance information may include timestamps based on clocks synchronized using a time protocol (e.g., a PTP or an NTP) or a heuristic time-alignment algorithm and wherein the at least one correlation technique involves correlating using the timestamps.

In some embodiments, performance information may include communication bus transactions information, test packet transmit or receive information or probe information from a test system, and/or host resource event log information or probe information from a host server.

In some embodiments, communication bus transactions information may be derived from peripheral component interconnect express (PCIe) bus, CXL bus, or other bus transactions associated with processing the at least one test packet.

In some embodiments, a monitoring agent (e.g., monitoring agent 142) may include or use a software probe, a Linux kprobe, a Linux uprobe, a Linux USDT probe, an XDP hook, a TC hook, BPF logic, or eBPF logic (e.g., a program). For example, software probes running on OS 126 may be used to monitor or trace application layer events, presentation layer events, session layer events, transport layer events, network layer events, driver layer events, kernel layer events, and/or other events involving NIC 104.

In some embodiments, a host server (e.g., node 102, tester 306, SUT 310) comprising a second monitoring agent may be configured for receiving, via the NIC, the at least one test packet; generating, using the second monitoring agent, host resource event log information associated with processing the at least one test packet by the host server; and storing or providing the host resource event log information for data analysis.

In some embodiments, a NIC (e.g., SmartNIC 104) may be located in a host server (e.g., node 102), a node of monitoring system 100, or a node in test environment 300.

In some embodiments, a test traffic generator may located or implemented in a NIC (e.g., SmartNIC 104), a host server (e.g., node 102), a node of monitoring system 100, or a node in test environment 300.

In some embodiments, a monitoring agent of a host server (e.g., node 102) may include or uses a software probe, a Linux kprobe, a Linux uprobe, a Linux USDT probe, an XDP hook, a TC hook, BPF logic, or eBPF logic. For example, software probes running on OS 124 may be used to monitor or trace application layer events, presentation layer events, session layer events, transport layer events, network layer events, driver layer events, kernel layer events, or other events involving host CPU 106.

It will be appreciated that process 400 is for illustrative purposes and that different and/or additional actions may be used. It will also be appreciated that various actions described herein may occur in a different order or sequence.

It should be noted that node 102, SmartNIC 104, test system 302, MLA 114, ECE 144, and/or functionality described herein may constitute one or more special purpose computing devices. Further, node 102, SmartNIC 104, test system 302, MLA 114, ECE 144, and/or functionality described herein can improve the technological field of testing networks and related nodes by providing techniques and mechanisms for SmartNIC testing and/or obtaining information from SmartNIC related probes.

In some embodiments, systems, methodologies, or functionality described herein may be usable for quality assurance and validation of ASICs, both pre-silicon and post-silicon. For example, systems, methodologies, or functionality described herein may be usable by firmware engineers for developing bug-free firmware, by kernel developers for developing efficient kernels, and by software engineers for developing high performance applications. For example, by using architecture and/or methodologies described herein, an application developer may identify "pain points" causing poor application performance, e.g., occurring in a physical layer and/or a data link layer that the developer may is less familiar with.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for smart network interface card testing, the method comprising:
at a network interface card (NIC) comprising a network processing unit executing a monitoring agent for monitoring data traversing the NIC:
adding, via a Linux operating system executing on the network processing unit or a processor of the NIC, one or more Linux uprobes for instrumenting user-level code executed by the network processing unit for processing test packets;
adding, via the Linux operating system executing on the network processing unit or a processor of the NIC, one or more Linux kprobes for instrumenting kernel-level code executed by the network processing unit for processing test packets;
obtaining, from a test system or a test traffic generator, at least one test packet;
generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC and generating the NIC processing information using the monitored events, wherein the NIC processing information includes user-level code event information obtained using the one or more Linux uprobes and kernel-level code event information obtained using the one or more Linux uprobes; and
storing or providing the NIC processing information for data analysis.

2. The method of claim 1 comprising:
at the test system:
obtaining, from one or more sources, performance information associated with the at least one test packet, wherein the performance information includes the NIC processing information;
correlating, using at least one correlation technique, the processing performance information; and
providing correlated processing performance information to a test system user.

3. The method of claim 2 wherein the performance information includes timestamps based on clocks synchronized using a time protocol or a heuristic time-alignment algorithm and wherein the at least one correlation technique involves correlating using the timestamps.

4. The method of claim 3 wherein the communication bus transactions information is derived from peripheral component interconnect express (PCIe) bus, CXL bus, or other bus transactions associated with processing the at least one test packet.

5. The method of claim 2 wherein the performance information includes communication bus transactions information, test packet transmit or receive information or probe information from the test system, and/or host resource event log information or probe information from a host server.

6. The method of claim 1 wherein the monitoring agent includes or uses a software probe, a Linux Userland Statically-Defined (USDT) probe, an XDP hook, a TC hook, Berkeley packet filter (BPF) logic, or extended Berkeley packet filter (eBPF) logic.

7. The method of claim 1 comprising:
at a host server comprising a second monitoring agent:
receiving, via the NIC, the at least one test packet;
generating, using the second monitoring agent, host resource event log information associated with processing the at least one test packet by the host server; and
storing or providing the host resource event log information for data analysis.

8. The method of claim 7 wherein the NIC is located in the host server and/or the test traffic generator is implemented in the NIC or the host server.

9. The method of claim 7 wherein the second monitoring agent includes or uses a software probe, a Linux kprobe, a Linux uprobe, a Linux Userland Statically-Defined (USDT) probe, an XDP hook, a TC hook, Berkeley packet filter (BPF) logic, or extended Berkeley packet filter (eBPF) logic.

10. A system for smart network interface card testing, the system comprising:
a network processing unit; and
a network interface card (NIC) comprising the network processing unit executing a monitoring agent for monitoring data traversing the NIC, wherein the NIC is configured for
adding, via a Linux operating system executing on the network processing unit or a processor of the NIC, one or more Linux uprobes for instrumenting user-level code executed by the network processing unit for processing test packets;
adding, via the Linux operating system executing on the network processing unit or a processor of the NIC, one or more Linux kprobes for instrumenting kernel-level code executed by the network processing unit for processing test packets;
obtaining, from a test system or a test traffic generator, at least one test packet;
generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC and generating the NIC processing information using the monitored events, wherein the NIC processing information includes user-level code event information obtained using the one or more Linux uprobes and kernel-level code event information obtained using the one or more Linux uprobes; and
storing or providing the NIC processing information for data analysis.

11. The system of claim 10 comprising:
the test system configured for:
obtaining, from one or more sources, performance information associated with the at least one test packet, wherein the performance information includes the NIC processing information;
correlating, using at least one correlation technique, the processing performance information; and
providing correlated processing performance information to a test system user.

12. The system of claim 11 wherein the performance information includes timestamps based on clocks synchronized using a time protocol or a heuristic time-alignment algorithm and wherein the at least one correlation technique involves correlating using the timestamps.

13. The system of claim 12 wherein the time protocol includes a precision time protocol (PTP) or a network time protocol (NTP).

14. The system of claim 11 wherein the performance information includes communication bus transactions information, test packet transmit or receive information or probe information from the test system, and/or host resource event log information or probe information from a host server.

15. The system of claim 14 wherein the communication bus transactions information is derived from peripheral component interconnect express (PCIe) bus, CXL bus, or other bus transactions associated with processing the at least one test packet.

16. The system of claim 10 wherein the monitoring agent includes or uses a software probe, a Linux Userland Statically-Defined (USDT) probe, an XDP hook, a TC hook, Berkeley packet filter (BPF) logic, or extended Berkeley packet filter (eBPF) logic.

17. The system of claim 10 comprising:
a host server comprising a second monitoring agent, wherein the host server is configured for:
receiving, via the NIC, the at least one test packet;
generating, using the second monitoring agent, host resource event log information associated with processing the at least one test packet by the host server; and
storing or providing the host resource event log information for data analysis.

18. The system of claim 17 wherein the NIC is located in the host server and/or the test traffic generator is implemented in the NIC or the host server.

19. The system of claim 17 wherein the second monitoring agent includes or uses a software probe, a Linux kprobe, a Linux uprobe, a Linux Userland Statically-Defined (USDT) probe, an XDP hook, a TC hook, Berkeley packet filter (BPF) logic, or extended Berkeley packet filter (eBPF) logic.

20. A non-transitory computer readable medium having stored thereon executable instructions embodied in the non-transitory computer readable medium that when executed by at least one processor of a computer cause the computer to perform steps comprising:
at a network interface card (NIC) comprising a network processing unit executing a monitoring agent for monitoring data traversing the NIC:
adding, via a Linux operating system executing on the network processing unit or a processor of the NIC, one or more Linux uprobes for instrumenting user-level code executed by the network processing unit for processing test packets;
adding, via the Linux operating system executing on the network processing unit or a processor of the NIC, one or more Linux kprobes for instrumenting kernel-level code executed by the network processing unit for processing test packets;
obtaining, from a test system or a test traffic generator, at least one test packet;
generating, using the monitoring agent, NIC processing information associated with processing the at least one test packet, wherein generating the NIC processing information includes monitoring application layer events, presentation layer events, session layer events, transport layer events, network layer events, driver layer events, kernel layer events, or other events involving the NIC and generating the NIC processing information using the monitored events, wherein the NIC processing information includes user-level code event information obtained using the one or more Linux uprobes and kernel-level code event information obtained using the one or more Linux uprobes; and
storing or providing the NIC processing information for data analysis.

* * * * *